United States Patent [19]
Sunvold

[11] Patent Number: 6,071,544
[45] Date of Patent: Jun. 6, 2000

[54] DIETARY COMPOSITIONS AND METHOD FOR PROMOTING HEALTHY WEIGHT LOSS CATS

[75] Inventor: Gregory D. Sunvold, Eaton, Ohio

[73] Assignee: The Iams Company, Dayton, Ohio

[21] Appl. No.: 09/283,408

[22] Filed: Apr. 1, 1999

[51] Int. Cl.⁷ ....................................................... A23K 1/00
[52] U.S. Cl. .............................. 426/2; 426/623; 426/630; 426/635; 514/558; 514/560
[58] Field of Search ................................. 426/2, 623, 630, 426/635; 514/560, 558

[56] References Cited

U.S. PATENT DOCUMENTS

| | | | |
|---|---|---|---|
| 4,296,132 | 10/1981 | Lazarus et al. | 426/2 |
| 4,868,001 | 9/1989 | Maruta | 426/623 |
| 5,141,755 | 8/1992 | Weisman | 426/42 |
| 5,643,622 | 7/1997 | Sawhill | 426/41 |
| 5,775,913 | 7/1998 | Oglivie et al. | 514/57 |
| 5,804,210 | 9/1998 | Cook et al. | 424/440 |
| 5,855,917 | 1/1999 | Cook et al. | 424/502 |

OTHER PUBLICATIONS

Pawlosky et al., "Essential fatty acid metabolism in the feline: relationship between liver and brain production of long–chain polyunsaturated fatty acids", *J. of Lipid Research*, vol. 35, 1994.

Biourge et al., "Effects of protein, lipid, or carbohydrate supplementation on hepatic lipid accumulation during rapid weight loss in cats", *Am. J. Vet. Res.*, vol. 55, No. 10, Oct. 1994.

*Primary Examiner*—James H. Reamer
*Attorney, Agent, or Firm*—Killworth, Gottman, Hagan & Schaeff, LLP

[57] ABSTRACT

A dietary composition is provided for promoting healthy weight loss in cats which contains, on a dry matter basis, from about 0.2 to 1.5% by weight fatty acids selected from the group consisting of C18:3n3, C20:4n6, C20:5n3, C22:6n3, and mixtures thereof, and from about 28 to 50% by weight protein. The composition may be administered to obese cats to provide optimum weight loss while preventing hepatic lipidosis and other associated diseases.

21 Claims, 5 Drawing Sheets

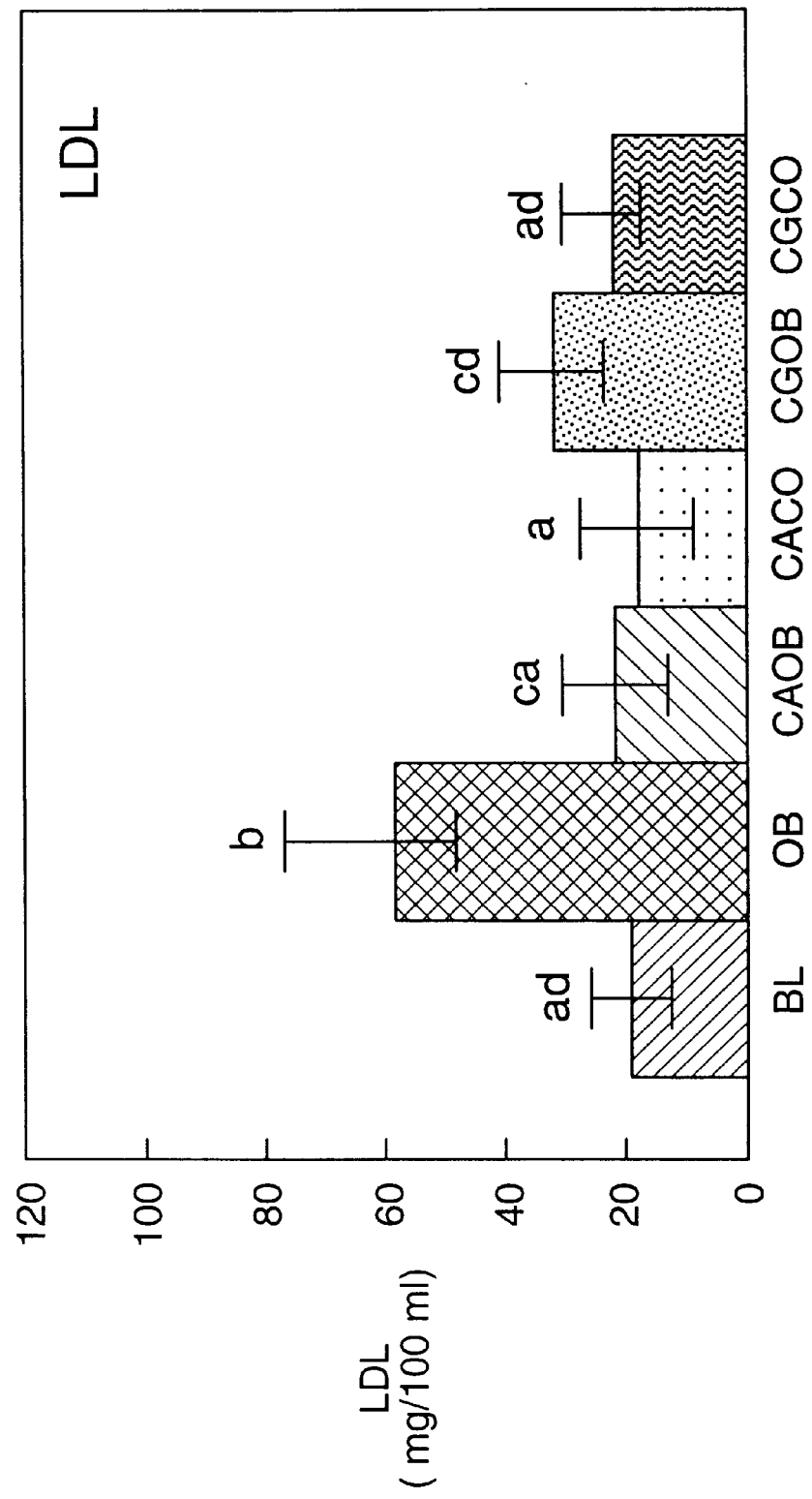

DIETARY COMPOSITIONS AND METHOD FOR PROMOTING HEALTHY WEIGHT LOSS CATS

BACKGROUND OF THE INVENTION

This invention relates to a dietary composition and method for promoting healthy weight loss in cats, and more particularly, to a dietary composition which includes a combination of fatty acids and protein and which, when fed to cats, promotes effective weight loss while preventing the development of diseases such as hepatic lipidosis.

Approximately 10 to 40% of cats receiving veterinary care have been reported to be overweight. Factors contributing to feline obesity include a sedentary lifestyle, confinement to indoors, and neutering. Neutered cats have a greater tendency toward weight gain, which may be due to decreased activity and altered metabolic rates. Obese cats have a greater risk for certain diseases including osteoarthritis, ligament injuries, perineal dermatitis, diabetes mellitus, cardiomyopathy, and urologic syndrome. Obese cats also appear to be particularly susceptible to feline hepatic lipidosis, a disease characterized by extensive lipid accumulation in liver parenchymal cells. Therefore, it is critical to maintain a healthy weight in order to minimize disease risk.

Safe weight loss plans must consider both the diet composition and the rate of weight loss to minimize the risk of developing diseases such as hepatic lipidosis. However, safe rapid weight loss in the feline has been made difficult because of the special dietary requirements of the cat which appear to make it more susceptible to hepatic lipidosis than other species. For example, cats appear to require 20 carbon long chain essential fatty acids such as 20:4n6 and 22:6n3 as they cannot convert dietary C18 essential fatty acids into long chain fatty acids due to a lack of Δ6 desaturase. However, the dietary levels of long chain essential fatty acids which may be needed has not been determined.

A lack of proper essential fatty acids in the diet, or essential fatty acid deficiency, is known to induce fatty livers in cats, which is believed to contribute to the development of hepatic lipidosis. Essential fatty acid deficiency is also known to affect transport of lipoproteins (very low density lipoprotein (VLDL), intermediate density lipoprotein (IDL), low density lipoprotein (LDL) and high-density lipoprotein (HDL)) from the liver and lipoprotein lipase, as well as affecting lecithin cholesterol acyltransferase and fatty acid synthetase activities. Alterations of any of these parameters may contribute to the development of hepatic lipidosis.

While studies have been conducted to evaluate the effect of protein on diets designed to prevent the development of feline hepatic lipidosis, there has been little study which addresses protein-lipid interactions on weight loss and the development of feline hepatic lipidosis. Further, previous studies have used primarily diets having only single nutrients (protein, carbohydrates, fat), and have not accounted for other nutrient deficiencies (vitamin/mineral).

Accordingly, there is still a need in the art for a dietary composition for felines which provides safe, effective weight loss while preventing the development of feline hepatic lipidosis (FHL) and associated diseases.

SUMMARY OF THE INVENTION

The present invention meets that need by providing a dietary composition for cats which includes long chain essential fatty acids and protein in amounts which have been found to promote healthy weight loss while preventing the development of hepatic lipidosis.

In accordance with one aspect of the present invention, a dietary composition for promoting healthy weight loss in cats is provided which comprises, on a dry matter basis, fatty acids comprising at least 1 to 15% by weight C18, at least 0.09 to 0.5% by weight C20 and at least 0.075 to 0.2% by weight C22, and from about 28 to 50% by weight protein. The designations C18, C20 and C22 are short hand references to 18, 20 and 22 carbon long chain fatty acids. By C18 fatty acids, it is meant fatty acids including C18:2n6, C18:1, C18:3n3, and C18:0. By C20 fatty acids, it is meant fatty acids including C20:4n6, C20:5n3, and C20:0. By C22 fatty acids, it is meant fatty acids including C22:6n3 and C22:1.

In a preferred embodiment of the invention, the dietary composition comprises from about 0.2 to 1.5% by weight fatty acids selected from the group consisting of C18:3n3 (α-linolenic acid), C20:4n6 (arachidonic acid), C20:5n3 (eicosapentanenoic acid), C22:6n3 (docosahexaneoic acid), and mixtures thereof, and from about 28 to 50% by weight protein. The composition preferably contains at least 0.04% by weight C18:3n3, at least 0.045% C20:4n6, at least 0.04% C20:5n3, and at least 0.075% C22:6n3. More preferably, the composition contains from about 0.04 to 0.6% by weight C18:3n3, from about 0.045 to 0.3% by weight C20:4n6, from about 0.04 to 0.2% by weight C20:5n3, and from about 0.075 to 0.2% by weight C22:6n3. The ratio of total n6:n3 fatty acids in the composition is preferably from about 2:1 to 15:1.

The source of fatty acids is preferably selected from the group consisting of poultry fat, fish oil, fish meal, borage oil, ground flax, and blends thereof. The composition preferably comprises from about 7 to 27% by weight total fat, and more preferably, about 7 to 14% by weight total fat.

Preferably, the source of protein is a high quality protein i.e., a protein which provides a protein efficiency rate (grams weight gain/grams protein intake) of at least 2.0. The preferred source of protein is preferably selected from the group consisting of casein, chicken, turkey, beef, lamb, and blends thereof.

When the composition of the present invention is administered to cats in a quantity and frequency appropriate for their nutritional needs, it has been found that the cats exhibit effective weight loss and do not develop hepatic lipidosis. We have also found that the cats exhibit decreased free fatty acid levels and increased high density lipoprotein-cholesterol (HDL) levels in their blood, which levels are believed to be beneficial in preventing other diseases associated with obesity such as heart disease.

Accordingly, it is a feature of the present invention to provide a dietary composition and method of use for cats which promotes healthy weight loss while preventing the development of hepatic lipidosis. Other features and advantages of the invention will be apparent from the following description, the accompanying drawings, and the appended claims.

DETAILED DESCRIPTION OF THE PREFERRED EMBODIMENT

Figure 1A:
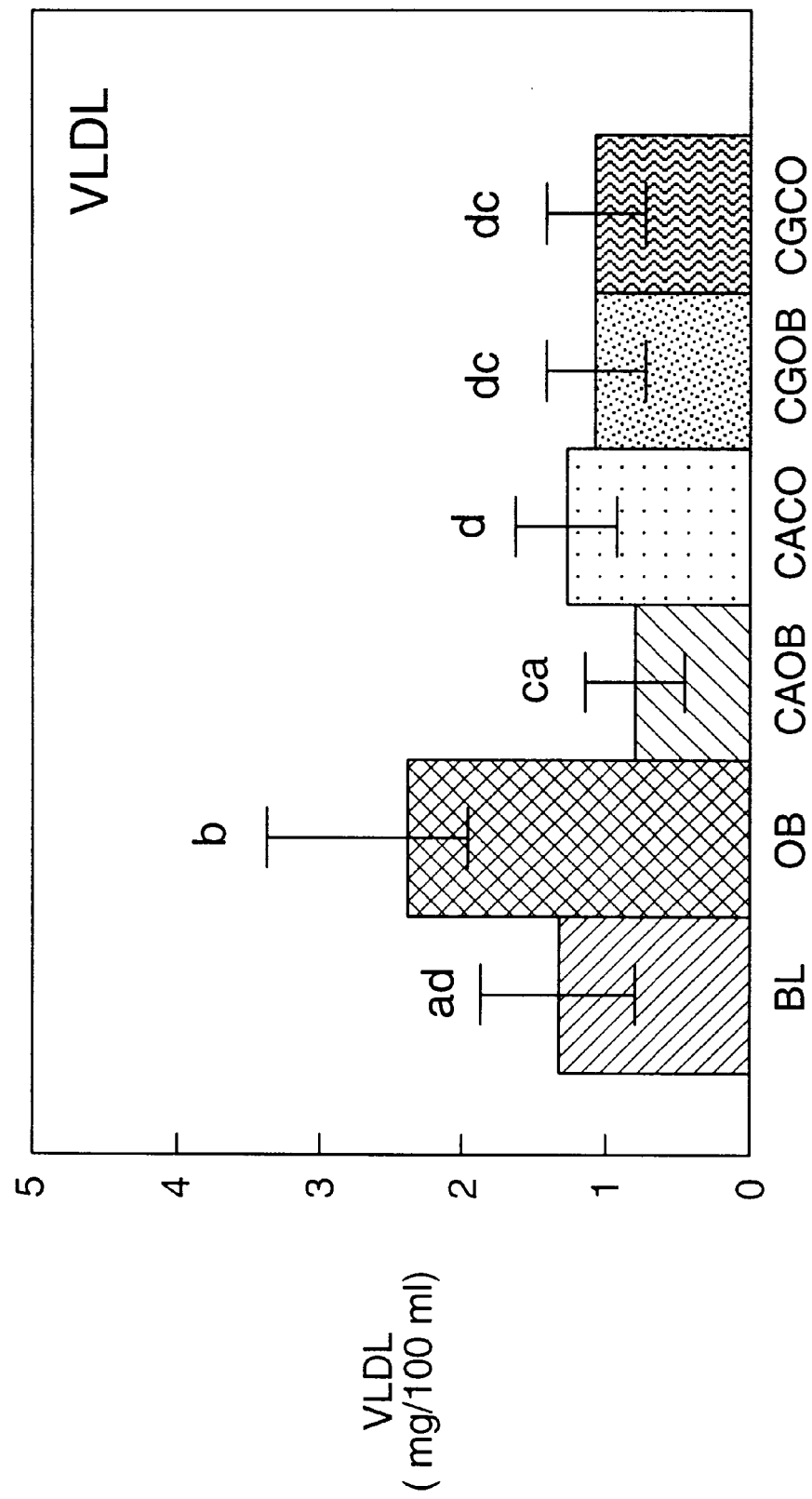
FIG. 1 is a series of bar graphs showing the effects of obesity, weight loss and different diets on lipoprotein cholesterol concentrations.

The dietary composition of the present invention provides an improvement over currently available dietary compositions in that the composition uses a specific combination of fatty acids in combination with a high quality protein to promote safe, effective weight loss in the cat without contributing to the risk of the animal developing hepatic lipidosis.

A study was undertaken to determine the effects of diets containing a low (protein efficiency rate of<2.0) or high (protein efficiency rate of>2.0) quality protein source (corn gluten meal and casein, respectively) and their interaction with C20:4n6 and C22:6n3 deficient (long chain essential fatty acid deficient (LCEFAD)) and C20:4n6 and C22:6n3 sufficient (long chain essential fatty acid (LCEFA)) diets fed at 25% of calculated ideal body weight maintenance energy requirement (MaE). By "sufficient", it is meant that the diets contained at least 0.045% by weight (on a dry matter basis) C20:4n6 and at least 0.075% by weight C22:6n3. By "deficient", it is meant that the diets contained less than 0.045% by weight C20:4n6 and less than 0.075% by weight C22:6n3.

The testing procedures and results are described below. The diets were formulated using a 2X2 factorial design as shown below in Table 1.

TABLE 1

| | |
|---|---|
| CAOB = Casein plus blend of poultry fat, borage and fish oil (high quality protein + 20C essential fatty acid sufficient) n = 5 | CGOB = Corn gluten meal plus blend of poultry fat, borage and fish oil (low quality protein + 20C essential fatty acid sufficient) n = 6 |
| CACO = Casein plus corn oil (high quality protein + 20C essential fatty acid deficient) n = 5 | CGCO = Corn gluten meal plus corn oil (low quality protein + 20C essential fatty acid deficient) n = 6 |

Twenty-four female cats, culled breeders (Hsd Cpb:CaDs) (Harlan Sprague Dawley, Indianapolis, Ind.), were procured. Cats were individually housed in an AAALAC-accredited facility, and maintained on a 12—12 light dark cycle at an average room temperature of 70° C. After a one week acclimatization, they were anesthetized (ketamine, acepromazine and isoflurane) and ovariohysterectomized. Blood samples (10 ml) were taken two days prior to surgery and a wedge liver biopsy was taken during surgery (all surgical procedures and animal protocol were carried out according the "Guide for the care and use of laboratory animals" and Institutional Animal Care and Use Committee approved). Prior to surgery cats were fed a commercial laboratory cat diet and water ad libitum. Following surgery, cats were fed a high quality energy dense diet (Eukanuba Veterinary Diets®, Nutritional Recovery Formula and Ocean Fish Formula Cat Food, The lams Company, Dayton, Ohio) ad libitum until they gained a minimum of 30% over their ideal weight. Once the animals attained at least 30 percent body weight gain, they were assigned randomly to one of four treatment groups (6 animals/treatment) in staggered intervals (4 animals/week; 1/each treatment/week)(See Table 1). Blood samples (10 ml) were taken again two days prior to obtaining a wedge liver biopsy. The cats were maintained on the various weight reduction diets for 7–8 weeks, or until they reached body weights similar to but not less than −10% of the ideal body weight established for healthy cats of the same body type and length. When the cats attained the desired body weights, liver biopsies and blood samples were obtained (blood samples were also taken after 21 days on the various weight reduction diets). If any of the cats had a bilirubin level>0.4 mg/dl during the weight loss period, they were to be discontinued from the study.

When placed on the weight reduction diet, one cat refused to eat due to a broken tooth and gum inflammation; this cat voluntarily remained in a fasted condition even after the tooth problem was corrected and ultimately developed feline hepatic lipidosis. Data are provided for this cat to contrast with the other weight loss groups.

All of the experimental diets were formulated and provided by The lams Company, Dayton, Ohio. The composition of the diets fed during the weight reduction is shown in Tables 2 and 3 below.

TABLE 2

Composition of Diets Fed to Obese Cats at 25% of Maintenance Energy for Weight Reduction

| | CGCO Corn gluten meal/corn oil | CGOB Corn gluten meal/oil blend | CACO Casein/ corn oil | CAOB Casein/ oil blend |
|---|---|---|---|---|
| Ingredients (%) | | | | |
| Corn gluten meal | 68.30 | 68.30 | | |
| Casein | | | 52.00 | 52.00 |
| Corn oil | 13.00 | | 18.70 | 3.90 |
| Poultry fat | | 11.70 | | 13.50 |
| Corn starch | 5.00 | 5.00 | 19.60 | 19.60 |
| Calcium carbonate | 3.70 | 3.70 | 0.02 | |
| Dried beet pulp | 3.00 | 3.00 | 3.00 | 3.00 |
| Monosodium phosphate | 2.40 | 2.40 | 0.49 | 0.49 |
| Choline chloride | 1.50 | 1.50 | 1.80 | 1.80 |
| Minerals | 1.20 | 1.20 | 1.20 | 1.20 |
| Vitamins | 1.20 | 1.20 | 1.20 | 1.20 |
| Sodium chloride | | | 1.00 | 1.00 |
| DL-methionine | | | 0.32 | 0.32 |
| Fish oil | | 0.90 | | 0.90 |
| Borage oil | | 0.15 | | 0.15 |
| Ground flax | | 0.15 | | 0.15 |
| Taurine | 0.15 | 0.15 | 0.15 | 0.15 |
| Potassium chloride | 0.49 | 0.49 | 0.54 | 0.61 |
| Nutrients | | | | |
| Protein % (4 kcal/g) | 45.09 | 44.37 | 42.97 | 41.94 |
| Moisture % | 5.81 | 7.62 | 10.28 | 10.85 |
| Ash % | 7.87 | 7.98 | 7.36 | 7.06 |
| Fat % (9 kcal/g) | 17.18 | 17.29 | 17.1 | 18.51 |
| Crude fiber % | 2.22 | 2.34 | 2.28 | 1.59 |
| N-free extracts (%) (4 kcal/g) | 21.84 | 20.4 | 19.79 | 19.97 |
| Calculated energy (kcal/kg) | 4223 | 4146 | 4049 | 4142 |

TABLE 3

Fatty Acid Composition of Diets (expressed as % by weight of total diet composition)

| Fatty Acids | CGCO Corn Gluten Meal/corn oil | CGOB Corn gluten meal/oil blend | CACO Casein/ corn oil | CAOB Casein/ oil blend |
|---|---|---|---|---|
| C 16:1 | | 0.49 | | 0.47 |
| C 16:0 | 0.79 | 2.24 | 0.79 | 2.25 |
| C 18:2n6 | 10.29 | 4.36 | 10.76 | 5.45 |
| C 18:1 | 4.62 | 7.43 | 4.77 | 7.89 |
| C 18:3n3 | | 0.53 | | 0.40 |
| C 18:0 | 0.37 | 1.13 | 0.38 | 1.15 |
| C 20:4n6 | | 0.05 | | 0.05 |
| C 20:5n3 | 0.03 | 0.14 | 0.04 | 0.15 |
| C 20:0 | 0.09 | 0.02 | 0.10 | 0.04 |
| C 22:6n3 | | 0.19 | | 0.16 |
| C 22:1 | 0.03 | 0.04 | | 0.04 |
| C 24:1 | 0.03 | | 0.03 | |
| C 24:0 | 0.05 | 0.03 | 0.04 | 0.02 |

Diets were fed at 25% of ideal lean bodyweight maintenance energy requirement (MaE) according to the following formula: {[(ideal bodyweight kg×30 kcal/kg)+70]×1.4 activity factor}/4=25% MaE in kcal. Vitamins, choline, taurine and micro-minerals were supplemented at 4 times the NRC requirements so that animals consuming 25% MaE would be supplied with the normally required NRC amounts.

The protein efficiency ratio (PER=grams weight gain/grams protein intake) of the casein and corn gluten meal was determined using a ten day chick growth assay (Research and Development, The Iams Company, Lewisburg, Ohio). Day old male Hubbard broilers were fed an 18.5% crude protein commercial corn-soy starter diet for 7 days prior to initiation of the study. Egg protein was included as a standard in the assay. Birds were allotted to dietary treatment groups so that average body weights of chicks in each group were similar. Each treatment contained 5 replicates of 7 birds and each replicate of 7 birds was maintained as the experimental unit. All chicks were housed in thermostatically controlled starter batteries with raised wire floors in an environmentally regulated room and allowed ad libitum access to water and feed for the duration of the study. Test ingredients were included in an amount necessary for finished diets to contain 9% crude protein. The basal portion of each diet included dextrose (30%), corn oil (5%), glista salts (5.37%), choline chloride (0.20%), a commercial vitamin premix (0.20%), and corn starch to 100%. Feed consumption and body weights were measured during the 10 day growth period to determine PER.

Measurements and Collections

Body weights were recorded weekly and chest girth prior to and after the weight reduction period.

Blood samples (10 ml/collection period) were taken from the jugular vein of sedated cats (medetomidine hydrochloride, 0.3 ml and atopanezole hydrochloride, sc) at 1) baseline, 2) following a minimum 30% weight gain, 3) after 21 days and 4) approximately 49 to 63 days on the weight loss diets (time varied per individual cat to attain the calculated 30% weight loss). Samples were drawn into glass vacutainer tubes with or without EDTA for plasma or serum. following a 16 hour fast. Samples were centrifuged at 4° C. and the serum or plasma samples stored at −70° C. prior to analysis.

Liver biopsies were performed on the anaesthetized cats as a wedge biopsy at the beginning of the protocol (during the ovariohysterectectomy procedure), after the cats attained a minimum of 30% weight gain, and then following the loss of at least 30% of body weight. Liver samples were fixed in phosphate-buffered 10% formalin for assessment of histopathology using light microscopy or extracted into hexane-isopropanol (3:2 vol) for lipid analysis.

To determine fatty liver content, a portion of the liver samples were weighed, extracted with hexane isopropanol (3:2 volume), dried under nitrogen and the lipid content expressed on a liver dry weight basis. Another portion of the liver was fixed with 10% buffered formalin, paraffin embedded, sectioned and stained with H&E and osmium tetroxide for assessing neutral lipids using normal laboratory procedures.

Slides were digitized using a Zeiss (Germany) microscope connected to image processing software (NIH IMAGE 1.60). Threshold optical density values were set to blank out non-specific staining. Optical density units thus directly correlate with the intensity of neutral lipid staining and are expressed as % optical density/mm. Values were also expressed on a 1 to 6 scale with 1 to 2 considered normal, 3 to 4 having mildly increased lipid staining, 5 showing definite lipid accumulation and 6 equal to severe lipidosis; all samples were assessed with the operator blinded to the sample origin.

Electron microscopic analysis of representative liver samples was also conducted. Tissue samples (1 mm) were immersed in a solution containing 4% paraformaldehyde (Sigma, St Louis, Mo. U.S.A.) and 0.5% glutaraldehyde in 0.14 mol/l phosphate buffer, at pH 7.0, for several weeks. After thorough washing in the same buffer, the samples were postfixed in 2% osmium tetroxide (Electron Microscopical Sciences, Fort Washington, Pa.), dehydrated in a series of ethanol, then embedded in Durcupan resin (Fluka, Buchs, Switzerland). Sixty run ultra-thin sections were cut with a diamond knife on a Reichert-Jung Ultracut E ultramicrotome (Vienna, Austria). The ultra-thin sections were contrasted with lead citrate (Ted Pella, Inc., Redding, Calif., U.S.A.) and uranyl acetate (Merck, Darmstadt, Germany), then viewed, and photographs taken using a JEOL 200CX electron microscope (Tokyo, Japan). The sections were analyzed as follows: 10 cell profiles/section/sample were counted and the number of lipid inclusions and peroxisomes (small, round, about 250–500 nm in diameter, with crystalloid inclusions) were determined/cell profile. The average for all profiles was then calculated.

Biochemical assessment was done on plasma samples at baseline, following maximum weight gain, 21 days after starting the weight reduction feeding protocol and at the end of weight reduction period (Vet panel 1—Roche Cobas Mira, Roche Diagnostics Systems, Somerville, N.J.). Serum insulin was determined by using an insulin coated tube radioimmunoassay according to a previously reported procedure which has been validated for the feline 21 (IVDL, Inc., Fishers, Ind.).

Statistical Analysis Data were analyzed by two way analysis of variance (ANOVA) followed by least square means analysis (LSM) to measure significant differences between treatment groups. Differences between means were considered significant at $p<0.05$ (SYSTAT 7.0, SYSTAT, Inc. Evanston, Ill.).

Lipoprotein cholesterol and triglycerides were measured enzymatically using cholesterol and triglyceride kits (Sigma Chemical Co., U.S.A.). To prepare VLDL, 400 $\mu$l of plasma was transferred to a polycarbonate tube (11×34 mm) and overlayed with 600 $\mu$l of d=1.006 KBr solution, and submitted to ultracentrifiugation (2 h, 15° C., 435,680×g). The VLDL in the top 400 $\mu$l of each tube was harvested by aspiration. To prepare intermediate density lipoprotein-cholesterol (IDL), the density of the lower fraction was adjusted to 1.019 g/ml by adding 24.3 $\mu$l of d=1.34 solution and the final volume brought to 1 ml with d=1.019 solution. Centrifugation was performed as described. The IDL in the top 400 $\mu$l of each tube was harvested by aspiration.

To prepare LDL, 600 $\mu$l of the lower fraction was mixed with 95.3 $\mu$l of d=1.34 solution and 304.7 $\mu$l of d=1.063 solution and centrifuged for 2.5 hours ( same temp and g); 400 $\mu$l of each tube was harvested by aspiration.

To prepare HDL, the density of 600 $\mu$l of the lower fraction was adjusted to 1.21 g/ml by adding 678.5 $\mu$l of d=1.34 solution. The sample was brought to a final volume of 1.3 ml with 21.5 $\mu$l of d=1.21 solution. Only 1 ml of the mixture was submitted to ultracentrifugation (3 h, same temp and g). A correction factor of ⅓ is needed to determine the concentration of the various analytes in the 400 $\mu$l of supernatant containing HDL.

Results

Weight Gain and Weight Loss

As shown in Table 4 below, the cats gained approximately 4.7 grams per day following the ovariohysterectomy until 80 days post surgery at which time no further weight gain was noted up to 108 days. Irrespective of the different diets fed at 25% of the MaE, all cats lost weight at a comparable rate (4.51–5.00 g/day/kg obese bodyweight) averaged over the entire weight loss period; the greatest rate of weight loss occurred during the first week of the diet (See Table 5);

there were no significant differences between the treatment groups. The cats lost about 7 to 10% of their obese bodyweight during the first week, 3 to 5% during the second week and 2 to 4% per week during the remainder of the weight loss period. The cat which voluntarily fasted lost weight at a greater rate (average 7.07 g/day/kg obese bodyweight or 5% bodyweight/week) than the cats maintained on 25% of the MaE (average 4.26 g/day/kg obese bodyweight or 3.3% bodyweight /week).

TABLE 4

Effect of Ovariohysterectomy on Body Weight Changes of Cats

| Days After Surgery | Body weight (Mean ± SD) (kg) (n = 24) | Body weight (Mean ± SD) (% of ideal) |
|---|---|---|
| 0 | 2.91 ± 0.57 | 100 ± 19.58 |
| 4 | 2.90 ± 0.41 | 99.65 ± 14.08 |
| 20 | 3.08 ± 0.58 | 105.84 ± 19.93 |
| 36 | 3.41 ± 0.57 | 117.18 ± 19.58 |
| 51 | 3.61 ± 0.57 | 124.05 ± 19.58 |
| 67 | 3.64 ± 0.53 | 125.08 ± 18.21 |
| 81 | 4.02 ± 0.69 | 138.14 ± 23.71 |
| 108 | 3.95 ± 0.75 | 135.73 ± 25.77 |

TABLE 5

Body Weight Changes of Cats on Weight Reducing Diets

| Days on Weight Reducing Diets | Voluntarily Fasting Cat (n = 1) | CGCO Corn gluten Meal/corn oil (Mean ± SD) (n=6) | CGOB Corn gluten Meal/Oil blend (Mean ± SD) (n = 6) | CACO Casein/ Corn oil (Mean ± SD) (n = 5) | CAOB Casein/ Oil Blend (Mean ± SD) (n = 5) |
|---|---|---|---|---|---|
| 0 (kg) | 5.05 | 4.00 ± 0.56 | 3.82 ± 0.71 | 3.57 ± 0.43 | 3.31 ± 0.70 |
| (%) of obese | 100.00 | 100.00 ± 15.24 | 100.00 ± 18.49 | 100.00 ± 12.00 | 100.00 ± 20.98 |
| 7 (kg) | 4.67 | 3.74 ± 0.50 | 3.57 ± 0.69 | 3.26 ± 0.49 | 3.07 ± 0.63 |
| (%) of obese | 92.48 | 93.66 ± 13.57 | 93.5 ± 18.18 | 91.16 ± 13.70 | 90.80 ± 19.0 |
| 14 (kg) | 4.42 | 3.60 ± 0.47 | 3.40 ± 0.70 | 3.10 ± 0.42 | 2.95 ± 0.61 |
| (%) of obese | 87.52 | 89.95 ± 12.91 | 89.05 ± 18.22 | 86.85 ± 11.76 | 88.19 ± 18.50 |
| 21 (kg) | 4.12 | 3.44 ± 0.47 | 3.27 ± 0.70 | 2.98 ± 0.41 | 2.83 ± 0.58 |
| (%) of obese | 81.58 | 85.95 ± 12.87 | 85.48 ± 18.42 | 83.49 ± 11.44 | 83.55 ± 17.53 |
| 28 (kg) | 3.90 | 3.33 ± 0.46 | 3.17 ± 0.66 | 2.90 ± 0.40 | 2.73 ± 0.56 |
| (%) of obese | 77.23 | 83.32 ± 12.51 | 82.86 ± 17.30 | 81.14 ± 11.17 | 80.83 ± 16.96 |
| 35 (kg) | 3.72 | 3.23 ± 0.45 | 3.08 ± 0.66 | 2.80 ± 0.39 | 2.65 ± 0.55 |
| (%) of obese | 73.66 | 80.73 ± 12.46 | 80.46 ± 17.14 | 78.29 ± 10.99 | 79.02 ± 16.58 |
| 42 (kg) | 3.46 | 3.16 ± 0.44 | 2.98 ± 0.65 | 2.72 ± 0.39 | 2.57 ± 0.52 |
| (%) of obese | 68.51 | 78.98 ± 11.95 | 77.98 ± 17.06 | 76.22 ± 11.03 | 75.32 ± 18.80 |
| 49 (kg) | 3.30 | 3.06 ± 0.42 | 2.89 ± 0.61 | 2.64 ± 0.39 | 2.50 ± 0.50 |
| (%) of obese | 65.35 | 76.65 ± 11.51 | 75.67 ± 16.07 | 73.92 ± 10.99 | 72.52 ± 15.22 |
| 56 (kg) |  | 2.99 ± 0.41 | 2.81 ± 0.62 | 2.57 ± 0.40 | 2.43 ± 0.49 |
| (%) of obese |  | 74.90 ± 11.18 | 73.57 ± 16.27 | 71.91 ± 11.32 | 70.39 ± 14.77 |
| 63 (kg) |  | 2.90 ± 0.40 | 2.89 ± 0.51 | 2.62 ± 0.37 | 2.35 ± 0.46 |
| (%) of obese |  | 72.64 ± 10.85 | 71.93 ± 12.61 (n = 5) | 73.13 ± 10.42 | 65.76 ± 13.80 |

Changes in chest girth prior to and after the weight loss period were similar between the treatment groups. However, the obese animals had significantly greater chest girth (32.0±2.2 cm) than following the weight loss period (27.8±1.5 cm). The average body length of the cats was 42.6±1.9 cm.

Protein Efficiency Ratio

The PER (grams weight gain/grams protein intake) for the diets fed were measured to be as follows: Casein/oil blend (CAOB)=2.3, Casein/corn oil (CACO)=3.0, Corn gluten meal/oil blend (CGOB)=11 and Corn gluten meal/corn oil (CGCO)=1.4.

Serum Lipids and Biochemistry

There were significant changes in serum lipid levels and other biochemical parameters due to weight gain and weight loss for all the treatment groups, but there were no significant differences noted between any of the dietary treatment groups. The serum biochemistry data for the weight loss period for all the treatment groups are combined and the data are shown in Table 6 below.

TABLE 6

Biochemistry of Cats Prior to Weight Gain (Baseline),
at a Minimum of 30% Weight Gain Above Baseline (Obese),
after 21 days on weight reduction diets (21$^{st}$ day),
and following at least 30% weight loss (final)

|  | Baseline | Obese | 21$^{st}$ Day | Final |
|---|---|---|---|---|
| Cholesterol (mg/dL) | 107.52 ± 23.78 | 193.39 ± 45.18 | 117.13 ± 22.82 | 154.27 ± 35.74 |
| Triglyceride (mg/dL) | 48.61 ± 37.2 | 60.65 ± 38.2 | 42.52 ± 14.03 | 38.18 ± 19.56 |
| Total bilirubine (mg/dL) | 0.17 ± 0.19 | 0.10 ± 0.06 | 0.069 ± 0.05 | 0.062 ± 0.05 |
| Glucose (mg/dL) | 139.39 ± 54.73 | 201.61 ± 73.46 | 154.7 ± 50.48 | 225.41 ± 75.98 |
| Insulin (mU/L) | 2.65 ± 2.49 | 2.55 ± 1.87 | 2.31 ± 1.85 | 6.53 ± 4.82 |
| Uric acid (mg/dL) | 0.31 ± 0.14 | 0.09 ± 0.06 | 0.09 ± 0.07 | 0.44 ± 0.24 |
| ALT (IU/L) | 78.61 ± 40.61 | 73.13 ± 33.59 | 62.82 ± 31.94 | 48.77 ± 25.86 |
| AST (IU) | 32.82 ± 9.94 | 30.32 ± 14.45 | 23.72 ± 8.02 | 22.76 ± 11.04 |
| LDH (IU) | 131.41 ± 52.29 | 115.55 ± 49.69 | 94.77 ± 44.35 | 129.82 ± 72.29 |
| Alkaline Phosphatase (IU) | 22.21 ± 9.90 | 32.47 ± 11.01 | 28.69 ± 9.26 | 14.09 ± 9.04 |
| Creatin Kinase (IU) | 437.61 ± 281.60 | 145.17 ± 131.02 | 80.65 ± 30.50 | 188.18 ± 141.05 |
| Creatinine (mg/dL) | 1.47 ± 0.20 | 2.00 ± 0.22 | 1.96 ± 0.20 | 1.62 ± 0.31 |
| Blood Urea Nitrogen (mg/dL) | 20.48 ± 3.64 | 26.17 ± 4.00 | 20.61 ± 2.66 | 25.00 ± 4.35 |
| Total Protein (g/L) | 6.27 ± 0.49 | 6.55 ± 0.48 | 6.09 ± 0.44 | 5.87 ± 0.73 |
| Albumin (g/L) | 3.15 ± 0.40 | 3.46 ± 0.32 | 3.42 ± 0.22 | 3.00 ± 0.24 |
| Globulin (g/L) | 3.12 ± 0.37 | 3.09 ± 0.53 | 2.67 ± 0.40 | 2.86 ± 0.68 |
| Ca (mg/dL) | 9.53 ± 0.89 | 9.81 ± 0.57 | 9.86 ± 0.35 | 9.12 ± 0.39 |
| P (mg/dL) | 4.55 ± 0.99 | 5.24 ± 0.67 | 4.93 ± 0.51 | 4.61 ± 0.53 |
| Mg (mg/dL | 2.13 ± 0.16 | 2.17 ± 0.25 | 2.11 ± 0.25 | 1.96 ± 0.26 |
| Na (mEqu/L) | 154.48 ± 2.64 | 155.48 ± 5.74 | 156.22 ± 5.37 | 153.32 ± 8.42 |
| K (mEqu/L) | 3.94 ± 0.36 | 4.26 ± 0.46 | 3.72 ± 0.62 | 4.70 ± 0.59 |
| Cl (mEqu/L) | 121.26 ± 2.47 | 121.22 ± 6.25 | 122.61 ± 6.33 | 124.27 ± 8.99 |

Serum cholesterol concentration was significantly elevated in the obese group compared to baseline, 21 day and the final weight loss period. There was no significant difference between baseline and the 21 day weight loss group whereas the final weight loss period differed significantly from both groups. Triglyceride values were also significantly elevated in the obese group compared to the 21 day and final weight loss groups. However, unlike cholesterol values, the triglyceride concentration was not significantly elevated at the end of the weight loss period and was not significantly different from the baseline value.

VLDL-Cholesterol

Figure 1B:
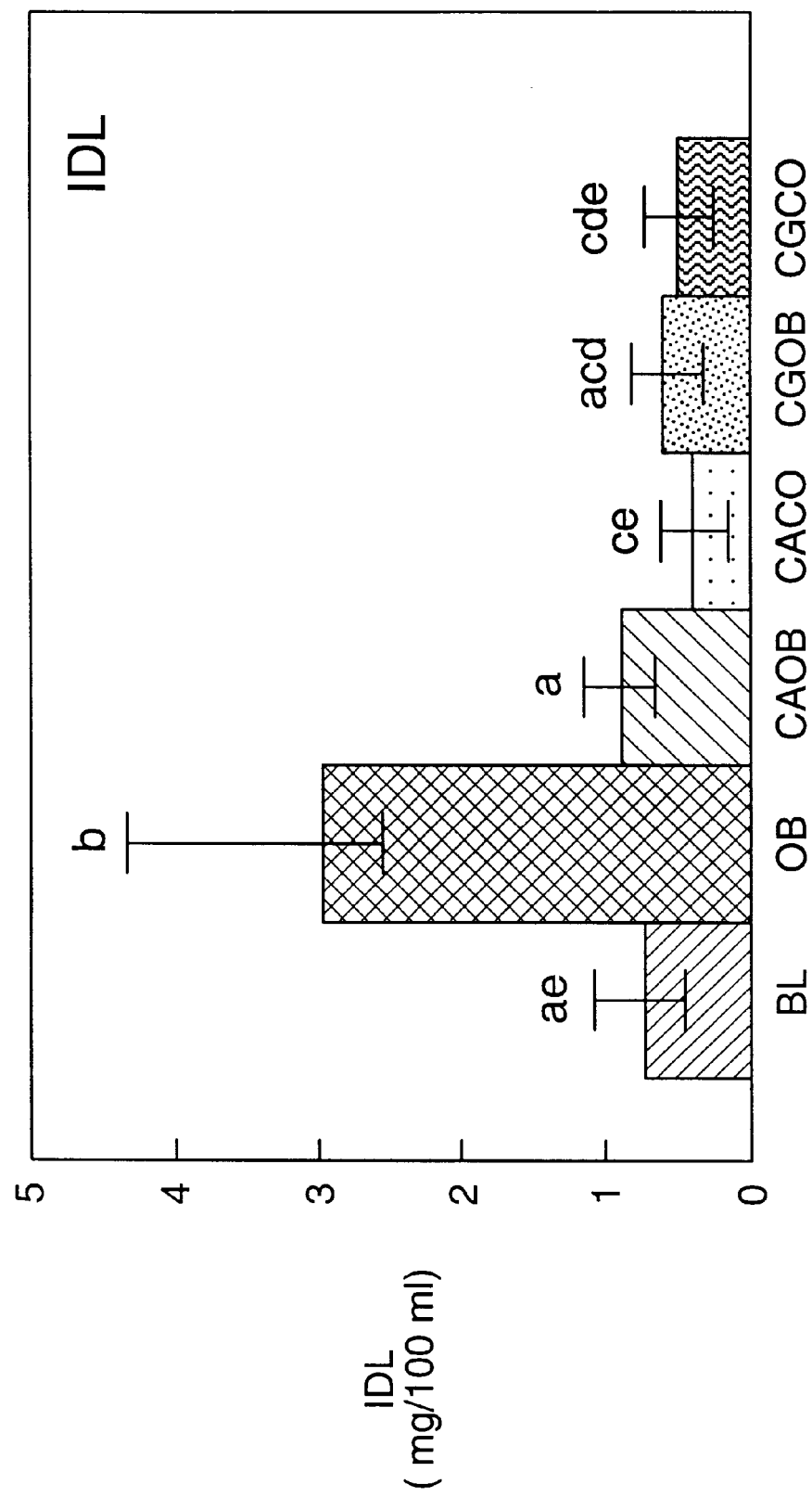
Figure 1D:
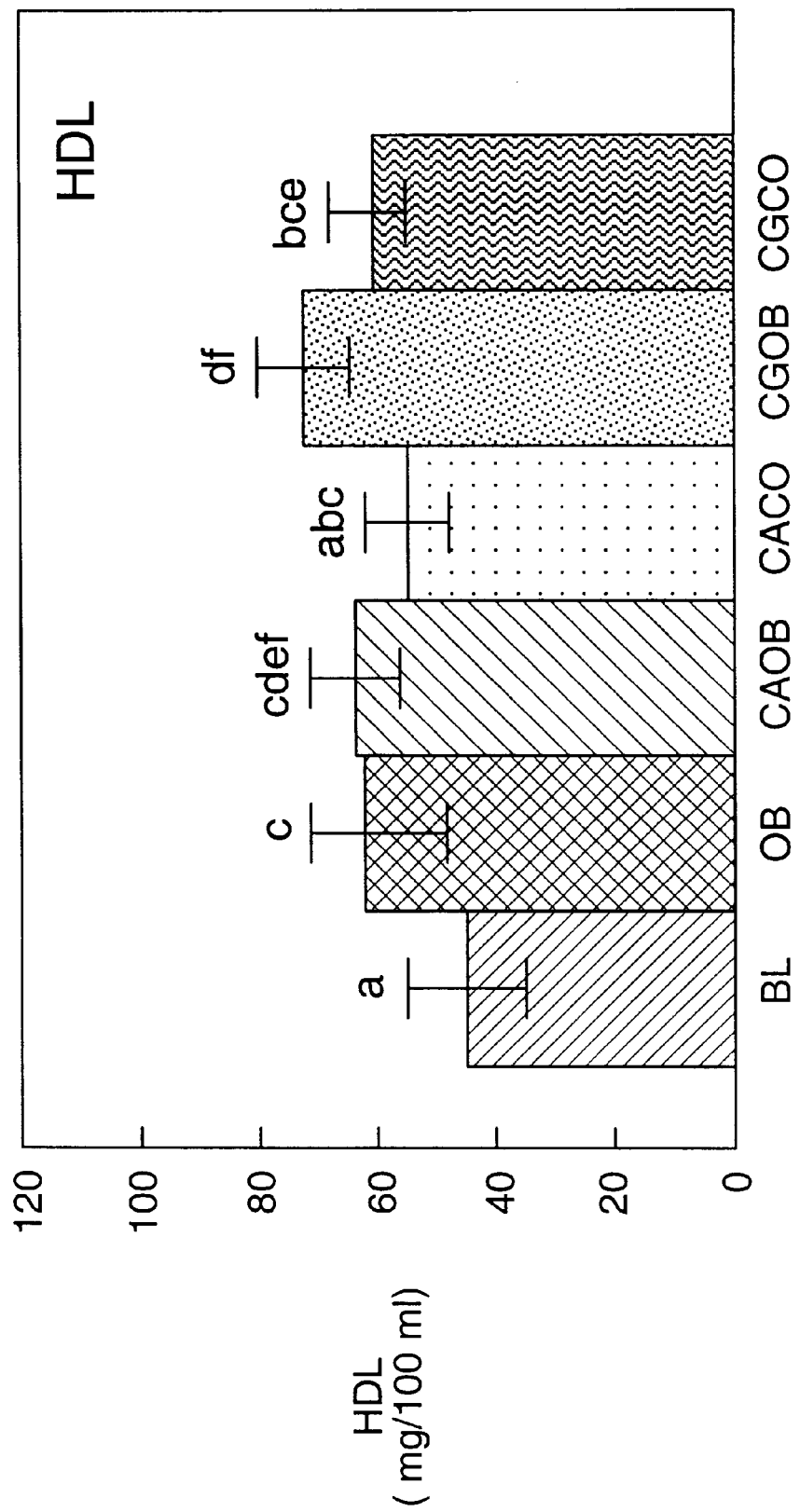

As shown in FIG. 1, there was a significant increase in plasma VLDL-cholesterol in the obese versus baseline and all weight loss dietary treatment groups. Comparing the dietary treatment groups, at the end of the weight loss period, the VLDL concentration in the CAOB group was significantly less then the CACO group. VLDL-triglyceride was also measured at baseline, following weight gain and after the weight loss on the various dietary treatments and the changes noted were similar to VLDL-cholesterol except that a significant difference was noted between the CAOB and the CGCO group (VLDL-triglyceride in mg/dl: BL=6.98±2.02; OB=7.64±1.92; CAOB=5.59±1.195; CACO=4.91±0.946; CGOB=5.05±0.86; CGCO=4.25±1.24). There were no significant oil or protein effects or oil-protein interactions regarding VLDL-cholesterol or triglyceride noted.

IDL-Cholesterol

Significant oil effects were noted for IDL. As depicted in FIG. 1 there was a significant, almost 4 fold, increase in IDL for the obese versus baseline and final weight loss dietary treatment groups. Furthermore, there were significant differences noted between the dietary treatments. The IDL concentration for the CAOB group was significantly different from the CACO and CGCO groups.

LDL-Cholesterol

There were no significant oil or protein effects or oil-protein interactions regarding LDL-cholesterol. Again, the obese group had significantly higher plasma LDL cholesterol concentrations versus baseline or dietary treatment groups (FIG. 1). CGOB was found to be significantly different from CACO.

HDL-Cholesterol

A main effect due to oil was found to be highly significant with a protein effect approaching significance (p=.0502); there was no significant interaction between oil and protein. The obese group showed significantly elevated HDL-cholesterol concentrations versus baseline. CGOB HDL-cholesterol concentrations were significantly greater than CACO and CGCO.

Plasma Free Fatty Acid (FFA)

No significant oil or protein effects were noted, however there was a significant protein and oil interaction. FFA in the CGCO group was significantly higher than the CAOB group. The cats which developed lipidosis (LIP) were shown to have significantly elevated FFA over all other dietary treatment groups prior to and following rapid weight loss.

Hepatic Lipidosis

Three cats developed hepatic lipidosis during the weight loss period as determined by liver lipid content (data not shown); one animal in the CAOB group consumed only 12% of maintenance energy requirement, one animal in the CACO refused to eat and one animal in the CGCO group developed hepatic lipidosis when consuming 25% of maintenance energy requirement.

Liver Lipids

Figure 2:
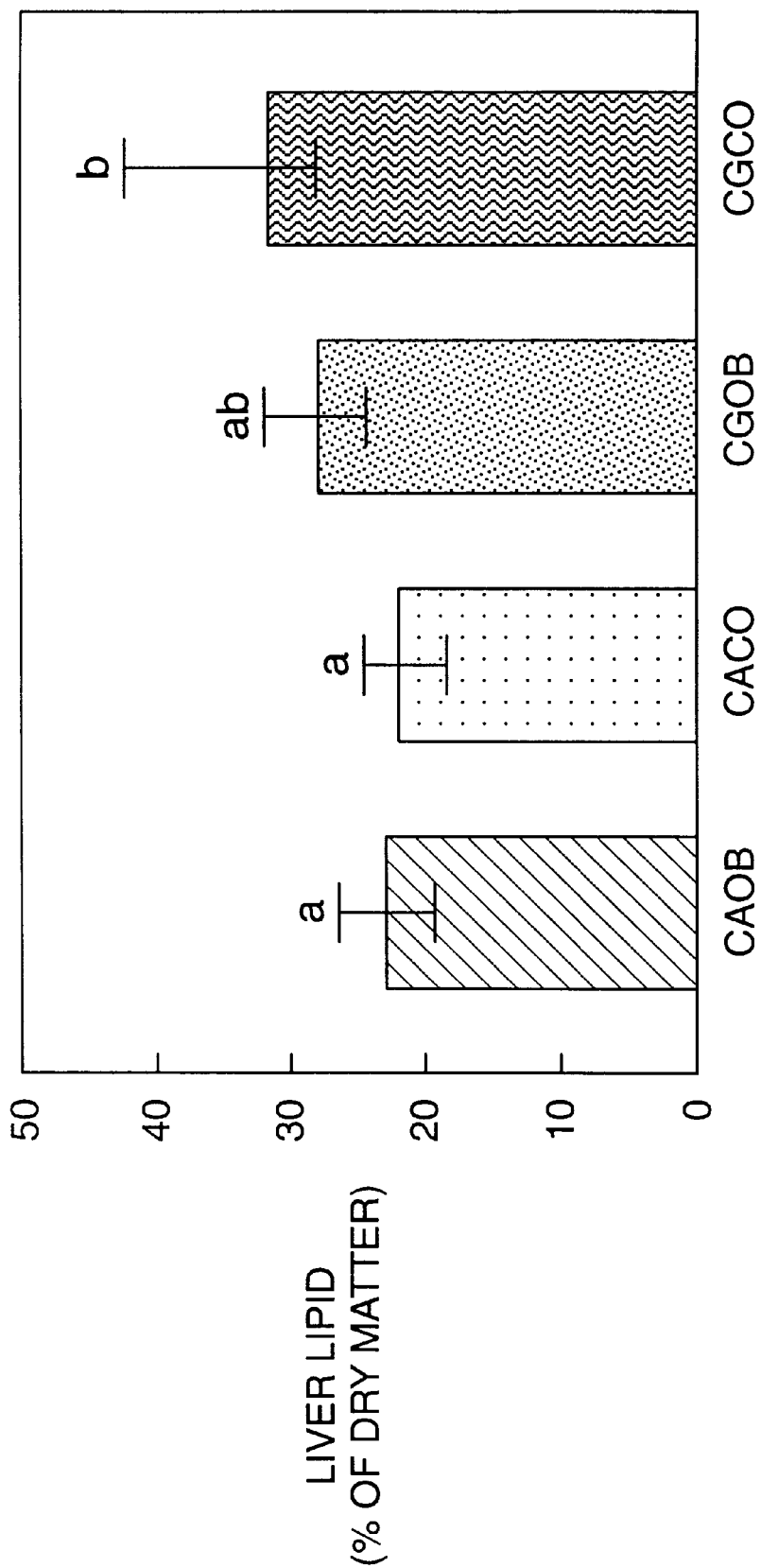
FIG. 2 is a bar graph showing the effect of different diets on liver lipid content following weight loss.

As shown in FIG. 2, the liver lipid content, as % of dry matter, was significantly altered by the dietary treatments during the weight loss period. There was also a significant protein effect. The liver lipid content was significantly higher in the corn gluten meal/corn oil group than in the casein/oil blend and the casein/corn oil supplemented animals; however, the corn gluten/corn oil group was not significantly different from the corn gluten meal/oil blend treatment.

Histology

The changes in liver triglycerides (expressed as % change from baseline values and final values minus obese values based on osmium tetroxide lipid staining particles) are shown in Table 7 below.

TABLE 7

Percent Change of Lipid Particles from Baseline in Cat Liver Sections Stained with Osmium Tetroxide

| | Baseline | | | |
|---|---|---|---|---|
| | 100 | 100 | 100 | 100 |
| Obese (Mean ± SD) | 181 ± 107 | 120 ± 27 | 163 ± 123 | 256 ± 101 |
| Diet Treatments | Casein/ Oil Blend | Casein/ Corn Oil | Corn Gluten/ Oil Blend | Corn Gluten/ Corn oil |
| Final (Mean ± SD) | 170 ± 24 | 185 ± 42 | 190 ± 58 | 350 ± 141 |
| Final − Obese | −11 | 65 | 27 | 94 |

There were no significant differences noted between dietary groups. In comparing the combined obese versus baseline values there was significantly more liver lipid accumulation in the obese group (data not shown). During the fasting period the liver triglycerides were increased more in the corn oil supplemented groups versus the oil blend groups. The group having the most liver triglycerides (obese and final values) was the corn gluten meal/corn oil group. Only in the corn gluten meal/corn oil group did any of the animals show histopathologic changes and other symptoms associated with feline hepatic lipidosis (FHL).

It was noted that the animal showing symptoms of FHL and lipid accumulation in the liver, from the corn gluten meal/corn oil group, also exhibited a marked reduction, or a complete absence, of peroxisomes compared to a cat from the casein/corn oil group. Furthermore, many of the lipid droplets in the FHL cat livers were heterogeneous in size and electron density, inclusion bodies were present, and the fine structural changes suggested an alteration in lipid and protein metabolism.

Discussion

The body weight gains of the cats increased consistently following ovariohysterectomy until 80 days post surgery after which the weights reached a new plateau (set point) and no further weight gain was observed up to 108 days in most animals; it is well documented that neutering an animal contributes to weight gain. Total weight loss and the rate of weight loss on the 25% MaE diets showed no significant differences between the dietary groups during the weight loss period, suggesting that neither low or high quality protein and/or dietary LCEFA status markedly alter weight loss patterns during this period. The cats lost about 7 to 10% of their obese body weight during the first week to 5% during the second week and 2 to 4% per week during the remainder of the weight loss period. The current diets, which varied in protein quality, provided approximately one half the amount (2 grams protein/kg bodyweight/day) reported to maintain greater than 80% of lean body mass. Although we did not directly measure lean body mass, the animals in the casein/oil blend, casein/corn oil, and corn gluten meal/oil blend groups all appeared healthy from both a visual and biochemical assessment throughout most of the weight loss period (insulin and glucose were elevated at the end of the weight loss period).

It is apparent from the data that obese cats had significantly higher serum cholesterol concentrations compared to baseline values. Following 21 days of weight loss, the cholesterol values decreased in all dietary groups and then increased with the continued weight loss. Triglyceride (TG) concentrations were also significantly different comparing the obese to the final weight loss group.

The changes in triglyceride and cholesterol concentrations in the study, while showing significant changes with duration of the weight loss period, were within normal ranges reported for the feline. These changes in total cholesterol concentration might be related to 1) increased cholesterol synthesis rates to provide for greater steroid hormone production during the continued catabolic state, 2) decreased clearance of LDL from circulation due to LDL receptor down regulation, 3) decreased HDL clearance or increased HDL production which may be associated with greater cellular breakdown and increased reverse cholesterol transport, and/or 4) diminished protein stores resulting in altered apoprotein synthesis. The data in Table 6 indicate that serum protein concentration is significantly reduced during the weight reduction period.

With the exception of the voluntarily fasting cat and a cat from the corn gluten meal/corn oil group, none of the animals developed overt symptoms or biochemical or histologic changes characteristic of FHL. However, as shown in FIG. 2 and Table 7, alterations in liver lipid content did occur with respect to the diets fed. The most lipid accumulation, assessed histologically and gravimetrically, occurred in the corn gluten meal/corn oil group, suggesting that poor protein quality and the absence of LCEFAs are involved in development of FHL.

The data suggest that greater accumulation of liver lipids during the weight gain period may be associated with, or contribute to, the development of FHL during a rapid weight loss period since the obese animals randomly assigned to the corn gluten meal/corn oil diet showed the highest liver lipid levels (Table 7). The mechanism(s) are not clear but may be associated with the changes in peroxisome numbers and the ability of the animal to oxidize longer chain fatty acids. Liver peroxisomes were absent in the cat that developed FHL in the corn gluten meal/corn oil versus a normal cat liver from the casein/corn oil fed group. The decline in peroxisome numbers appears to be related to the duration of the fast.

The increased liver lipids in FHL may be due to decreased transport from the liver in the form of VLDL. However, as shown in FIG. 1, it is evident that there is a significant decrease in VLDL-cholesterol in the weight loss groups compared to obese; the only significant difference between groups was the CACO vs CAOB groups. The animals which developed lipidosis also exhibited similar VLDL-cholesterol levels, suggesting that plasma VLDL concentrations are not altered in FHL.

It was noted that there was a significant oil effect regarding HDL. The oil blend groups had higher HDL plasma concentrations than the corn oil groups with the CGOB group being significantly higher than the CGCO group. The significant changes in total plasma cholesterol concentrations noted for the baseline versus obese and the obese versus weight loss groups is due primarily to changes in HDL. VLDL, IDL and LDL lipoprotein fractions returned to baseline values following rapid weight loss but the HDL concentration was further increased at this time period. Cholesterol concentration also increased during the shorter weight loss period both in lean as well as obese animals. It appears that an oil blend diet may be more beneficial than the corn oil diet since the HDL in the oil blend groups was significantly higher than in the corn oil groups.

The data suggest that neither increased triglyceride synthesis nor decreased VLDL transport from the liver is the primary mechanism involved in the development FHL during a rapid weight loss period. Therefore the mechanism(s) involved in the development of FHL are not clear but may be associated with increased mobilization of lipid stores. This is supported by the significantly higher FFA found in the cats which developed lipidosis and the somewhat higher FFA in the CGCO group.

The data further indicates that the interaction of dietary protein and lipid content has a greater effect on the cholesterol profile (see FIG. 1) than dietary protein or lipids alone.

Based on this data, the dietary composition of the present invention was formulated and preferably contains from about 0.2 to 1.5% by weight fatty acids selected from the group consisting of C18:3n3, C20:4n6, C20:5n3, and C22:6n3, and mixtures thereof, and from about 28 to 50% by weight high quality protein.

We have found that a 25 to 30% weight loss can be accomplished without any overt signs of developing feline hepatic lipidosis as long as the composition contains a high quality protein, includes the preferred amounts of long chain fatty acids, and is fortified with vitamins and micro-minerals so that the amount of diet consumed meets the vitamin and micro-mineral requirements of the cat. In addition to the preferred concentration of fatty acids, it should be understood that the composition may contain additional long chain fatty acids such as those listed in Table 3. For example, the composition preferably contains from about 4 to 7% by weight C18:2n6, from about 6 to 9% C18:1, and from about 0.5 to 2% by weight C18:0.

The dietary composition may be provided in any suitable form as long as it contains the preferred concentrations of fatty acids and protein on a dry matter basis. For example, the composition may be extruded and canned or provided in biscuit form.

The source of fatty acids in the composition preferably comprises a blend of poultry fat and one or more of fish oil, fish meal, borage oil, and ground flax. This blend of fats is believed to provide a fatty acid profile which provides safe weight loss. Preferably, the fatty acid blend comprises from about 0.04 to 0.6% C18:3n3 (α-linolenic acid), from about 0.045 to 0.3% C20:4n6 (arachidonic acid), from about 0.04 to 0.2% C20:5n3 (eicosapentaenoic acid), and from about 0.075 to 0.2% C22:6n3 (docosahexaenoic acid). These fatty acids preferably comprise from about 0.2 to 1.5% of the total composition on a dry matter basis.

The source of protein preferably comprises casein, but may comprise other sources of protein such as chicken, turkey, egg, beef, lamb, etc. as long as they provide a protein efficiency ratio of at least 2.0.

The composition also preferably contains vitamins and minerals including, but not limited to the following:

| Vitamins | Minerals |
| --- | --- |
| Vitamin E | Tricalcium phosphate |
| Niacin | Potassium chloride |
| Ascorbic acid | Potassium citrate |
| Vitamin A acetate | Magnesium sulfate |
| Biotin | Monosodium phosphate |
| Calcium pantothenate | Ferric methionine |
| Thiamine hydrochloride | Zinc sulfate |
| Pyridoxine hydrochloride | Copper sulfate |
| Vitamin $B_{12}$ | Manganese sulfate |
| Riboflavin | Sodium selenite |
| Inositol | potassium iodide |
| Vitamin $D_3$ | Cobalt sulfate |
| Folic acid | Ferrous sulfate |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A dietary composition for promoting healthy weight loss in cats comprising, on a dry matter basis, fatty acids comprising at least 1 to 15% by weight C18, at least 0.09 to 0.5% by weight C20 and at least 0.075 to 0.2% C22, and from about 28 to 50% by weight protein.

2. A dietary composition for promoting healthy weight loss in cats comprising, on a dry matter basis, from about 0.2 to 1.5% by weight fatty acids selected from the group consisting of C18:3n3, C20:4n6, C20:5n3, C22:6n3, and mixtures thereof, and from about 28 to 50% by weight protein, wherein the ratio of total n6 to n3 fatty acids is from about 2:1 to 15:1.

3. The composition of claim 2 containing at least 0.04% by weight C18:3n3.

4. The composition of claim 2 containing at least 0.045% C20:4n6.

5. The composition of claim 2 containing at least 0.04% C20:5n3.

6. The composition of claim 2 containing at least 0.075% C22:6n3.

7. The composition of claim 1 comprising from about 0.04 to 0.6% C18:3n3, from about 0.045 to 0.3% C20:4n6, from about 0.04 to 0.2% C20:5n3, and from about 0.075 to 0.2% C22:6n3.

8. The composition of claim 1 in which the source of said fatty acids are selected from the group consisting of poultry fat, fish oil, fish meal, borage oil, ground flax, and blends thereof.

9. The composition of claim 1 in which the source of protein is selected from the group consisting of casein, chicken, turkey, beef, lamb, and blends thereof.

10. The composition of claim 1 in which said protein has a protein efficiency ratio of at least 2.0.

11. The composition of claim 1 comprising from about 7 to 27% by weight total fat.

12. The composition of claim 1 comprising from about 7 to 14% by weight total fat.

13. A dietary composition for promoting healthy weight loss in cats comprising, on a dry matter basis, from about 28 to 50% by weight protein, said composition containing sufficient long chain essential fatty acids which, in combination with said protein, promotes said healthy weight loss.

14. A dietary composition as claimed in claim 13 comprising from about 0.045 to 0.30% by weight C20:4n6 and from about 0.075 to 0.2% by weight C22:6n3.

15. A method of promoting weight loss in cats while preventing hepatic lipidosis comprising the steps of:

administering an amount of a composition comprising, on a dry matter basis, from about 0.2 to 1.5% by weight fatty acids selected from the group consisting of C18:3n3, C20:4n6, C20:5n3, C22:6n3, and mixtures thereof, and from about 28 to 50% by weight protein.

16. The method of claim 15 in which said composition comprises from about 0.04 to 0.6% by weight C18:3n3, from about 0.045 to 0.3% by weight C20:4n6, from about 0.04 to 0.2% by weight C20:5n3, and from about 0.075 to 0.2% by weight C22:6n3.

17. A method of increasing blood plasma high density lipoprotein-cholesterol (HDL) levels in cats comprising the step of:

administering an amount of a composition comprising, on a dry matter basis, from about 0.2 to 1.5% by weight fatty acids selected from the group consisting of C18:3n3, C20:4n6, C20:5n3, C22:6n3, and mixtures thereof, and from about 28 to 50% by weight protein.

18. The method of claim 17 in which said composition comprises from about 0.04 to 0.6% by weight C18:3n3, from about 0.045 to 0.3% by weight C20:4n6, from about 0.04 to 0.2% by weight C20:5n3, and from about 0.075 to 0.2% by weight C22:6n3.

19. A method of decreasing blood plasma free fatty acids levels in cats comprising the step of:

administering an amount of a composition comprising, on a dry matter basis, from about 0.2 to 1.5% by weight fatty acids selected from the group consisting of C18:3n3, C20:4n6, C20:5n3, C22:6n3, and mixtures thereof, and from about 28 to 50% by weight protein.

20. The method of claim 19 in which said composition comprises from about 0.04 to 0.6% by weight C18:3n3, from about 0.045 to 0.3% by weight C20:4n6, from about 0.04 to 0.2% by weight C20:5n3, and from about 0.075 to 0.2% by weight C22:6n3.

21. A dietary composition for promoting healthy weight loss in cats comprising, on a dry matter basis, from about 28 to 50% by weight protein, from about 7 to 27% by weight total fat, and from about 0.2 to 1.5% by weight fatty acids selected from the group consisting of C18:3n3, C20:4n6, C20:5n3, C22:6n3, and mixtures thereof.

* * * * *

UNITED STATES PATENT AND TRADEMARK OFFICE
CERTIFICATE OF CORRECTION

PATENT NO : 6,071,544
DATED : June 6, 2000
INVENTOR(S) : Gregory D. Sunvold

It is certified that error appears in the above-identified patent and that said Letters Patent are hereby corrected as shown below:

[54] Title "DIETARY COMPOSITIONS AND METHOD FOR PROMOTING HEALTHY WEIGHT LOSS CATS" should read - - DIETARY COMPOSITIONS AND METHOD FOR PROMOTING HEALTHY WEIGHT LOSS IN CATS - - .

Signed and Sealed this

Third Day of April, 2001

*Attest:*

NICHOLAS P. GODICI

*Attesting Officer*　　*Acting Director of the United States Patent and Trademark Office*